Dec. 10, 1929.  T. F. BAILY  1,739,278
METHOD OF MAKING STEEL
Filed March 11, 1926
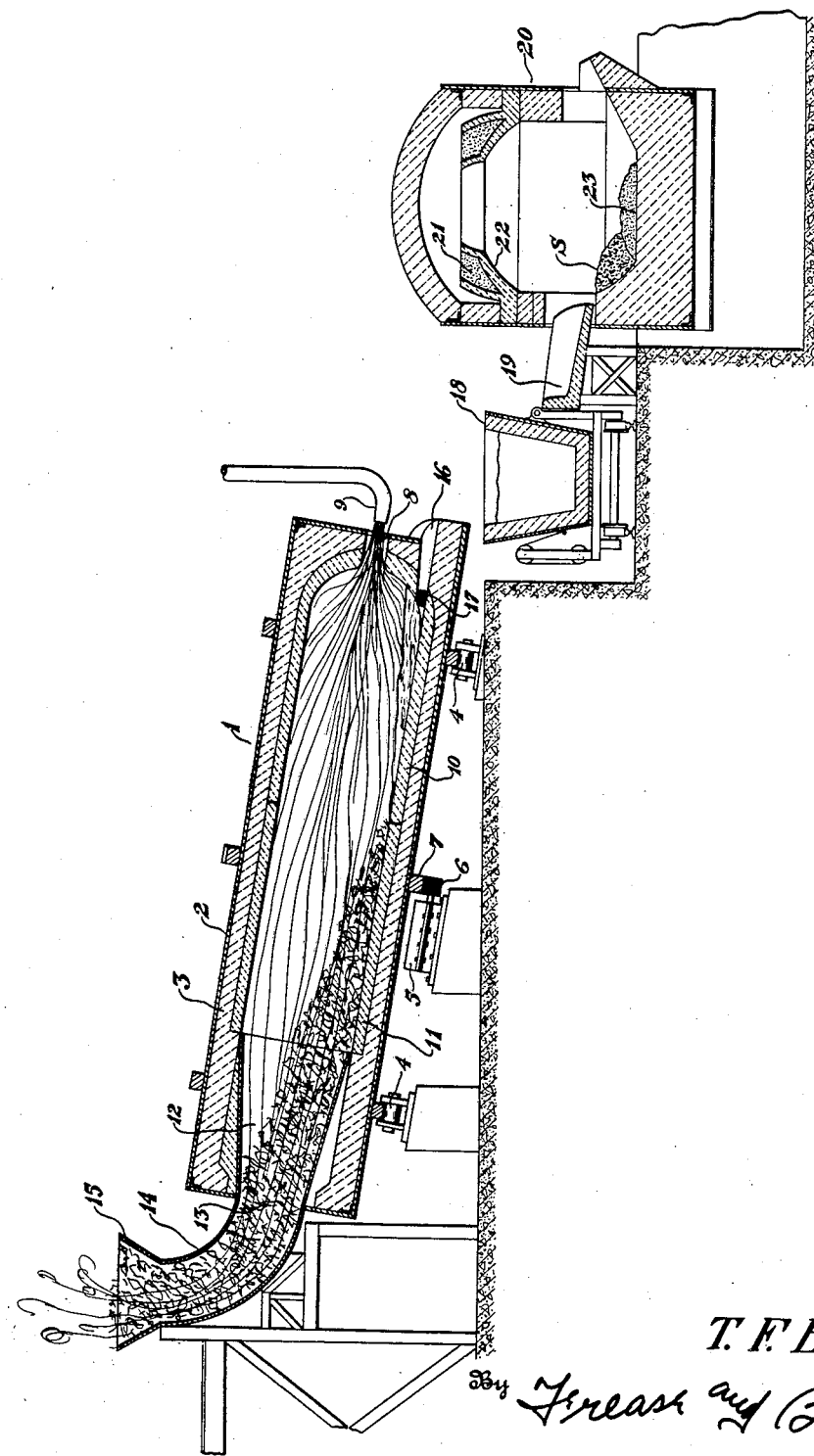
Inventor
T. F. Baily
By Freask and Bond
Attorneys Patented Dec. 10, 1929

1,739,278

UNITED STATES PATENT OFFICE

THADDEUS F. BAILY, OF ALLIANCE, OHIO

METHOD OF MAKING STEEL

Application filed March 11, 1926. Serial No. 93,894.

The invention relates to the making of steel or iron from cold pig iron or scrap or other suitable material which is melted in a continuous rotary furnace under an oxidizing flame and under an oxidizing slag, and transferring the molten metal to an electric furnace for final refining and finishing.

Where the scrap material composing the charge is melted and refined in the electric furnace, an excellent product is obtained, but since the principal advantage of an electric furnace is in the refining stage of the operation rather than in the heating and melting of the charge, the relatively high cost of electric energy for melting is seldom justified, since this melting, and even the oxidizing period for the removal of certain elements, can be as advantageously carried on with a fuel fired furnace, of the rotary type described herein, doing the work equally as well and at a much lower cost for equipment and operation, as well as materially increasing the capacity of the refining or finishing furnace, since its only function then is to carry out that phase of the operation which it inherently is best adapted to do; the rotary furnace in its turn performing the functions which the electric furnace is less suited for.

It is well known that rotary furnaces either inclined or horizontal, have been used in the attempt to reduce iron ore and the like; and also that inclined rotary furnaces have been used in the making of cement. They have also been used for the heating of metal parts for annealing or heat treating.

It is also well known that scrap has been melted and partially refined in stationary fuel fired furnaces, and then transferred to electric furnaces for final refining and finishing.
In the latter case, for instance, where an open hearth furnace has been used for melting and partial refining and the molten metal transferred to an electric furnace for final refining and finishing, in order that good economy may be obtained in the open hearth this furnace must be of large capacity, and in fact much larger than is feasible for transferring to the electric furnace, which in the present state of the art is of smaller hearth capacity than the melting unit.

Further, the operation of an open hearth requires great skill in handling, and a large investment, and expensive operation, as compared with the rotary furnace herein proposed; and, the open hearth furnace, when used as described, is a non-continuous process, and while regenerators are used to effect economy, the entire charge of the metal itself is substantially at the same temperature; while in the continuous, rotary furnace, the flame enters at, and the discharge end of the furnace is at, the highest temperature, while the products of combustion, as they pass through the furnace, are constantly passing over cooler incoming material until finally they pass out over cold stock. In this way better thermal economy is obtained than is possible in any other form of furnace.

In the case of melting in the cupola, while good economy is obtained from a fuel standpoint, the fuel is limited to coke, and the cupola must be charged with successive layers of coke and material to be melted, and the fuel with its attendant impurities is in immediate contact with the charge, with the result that such impurities as are found in the coke are certain to contaminate the metal, prohibiting any material refining action from taking place therein.

Further, when melting in the cupola, the material to be melted is limited to a definite character, that is relatively large pieces must be used in order to have the charge sufficiently porous at all times for the blast to pass through the charge. Fine material, if charged without briquetting, or in containers, stopping up the furnace, and in open hearth practice fine material cannot be advantageously melted; while in the rotary furnace material of the widest possible character can be melted, due to the tumbling action produced by the rotary movement of the furnace and the fact that the hearth is constantly being freed of the material and heated to a higher temperature than the charge.

As phosphorus is one of the common impurities to be found in pig iron and scrap, and requires a definite temperature and character of slag for its removal, the rotary furnace, described in the specification, lends itself readily to this operation, and one of the objects of the invention is to melt the charge with a suitable slag for eliminating and holding the phosphorus and removing the molten, partially purified iron to an electric furnace for final refining and finishing, feeding the charge practically continuously and removing the metal when a convenient quantitiy has been melted, and transferring it to the finishing furnace.

Irrespective, however, of any refining action of the slag, great economy can be obtained by the use of the continuous rotary furnace for pre-melting the charge of scrap or pig iron, or other suitable material, as compared with any other type of equipment that may be used for the purpose, and the furnace contemplated being inherently an oxidizing furnace, permits of refining operations that inherently require oxidizing conditions, and in order to have good fuel economy in a combustion furnace, an oxidizing atmosphere is essential.

One of the most desirable methods of operation of this equipment would be to melt the material of the charge continuously in the rotary furnace, under an oxidizing atmosphere and an oxidizing slag and transfer to the electric furnace operating under a reducing atmosphere and a reducing slag.

The drawing is a longitudinal sectional view through a rotary furnace, ladle and electric finishing or refining furnace arranged to carry out the invention.

Similar numerals refer to similar parts throughout the drawing.

The apparatus includes an inclined rotary cylindrical furnace indicated generally at 1 and comprising a steel jacket 2 lined with heat insulation 3 and mounted upon rollers 4 upon which it is arranged to be driven as by the motor 5 provided with a pinion 6 meshing with the ring gear 7 surrounding the cylinder.

The lower or melting end of the furnace is provided with the central opening 8 through which the flame from a gas burner 9 may be projected axially through the cylinder and this portion of the furnace is preferably lined with a basic lining 10 while the intermediate portion thereof may be lined with an acid lining as shown at 11.

The upper or receiving end of the furnace cylinder is preferably lined with a metal lining 12 of suitable abrasion resisting material which may be tapered toward the inlet end of the cylinder to form a constricted throat as at 13 into which the feed spout 14, leading from the hopper 15, is projected.

The lower end of the rotary furnace is provided, near its periphery, with a pouring spout 16 normally closed as by a plug 17 which may be withdrawn at intervals to permit the molten metal to be poured into the ladle 18, which may be provided with a scale, if desired, in order to weigh the desired amount of molten metal.

The molten metal is immediately transferred, as by the trough 19, from the ladle to the refining and finishing furnace indicated generally at 20 which may be of the type such as illustrated and described in my prior Patents No. 1,506,281 of August 26, 1924, and No. 1,546,534 of July 21, 1925, such furnace being preferably heated by a carbon resistor 21 carried in a trough 22 mounted above the hearth 23. This refining and finishing furnace may be acid lined.

In carrying out the process, pig iron or scrap, or other suitable material, together with lime and iron oxide or other suitable material for forming an oxidizing slag, may be continuously fed into the upper end of the rotary furnace, through the hopper 15 and feed neck 14.

The flame from the gas burner 8 passes axially through the material, melting the same as it reaches the lower acid lined portion of the furnace while the products of combustion pass through the scrap and pig iron in the restricted throat portion of the furnace as well as that entering through the feed neck 14, pre-heating the material as it enters the furnace.

The cylinder is continuously rotated during this operation melting down the metal and the slag forming material, forming an oxidizing slag upon the surface of the molten metal and maintaining an oxidizing atmosphere within the furnace chamber.

At the desired time the stopper plug 17 may be removed pouring the molten metal, with or without the slag thereon as desired, into the ladle 18, the molten material being immediately transferred to the electric furnace 20.

A reducing atmosphere is maintained in the refining and finishing furnace 20 and the molten metal is preferably kept under a reducing slag while in this refining furnace, this slag being produced by placing suitable reducing slag forming material, such as lime and carbon as indicated at S in the electric furnace. By providing a basic lining, in the melting portion of the rotary furnace phosphorus may be eliminated from the material during the melting operation.

I claim:

1. The method in the melting of scrap and pig iron and the like which consists in substantially continuously rotating the charge of material and simultaneously feeding the same downward in an inclined direction, introducing fuel for combustion and sufficient air to maintain an oxidizing flame at the lower end of the charge, introducing material for the production of an oxidizing slag at the upper end of the charge, and then maintaining the charge in molten condition under a reducing atmosphere.

2. The method in the melting of scrap and pig iron and the like which consists in substantially continuously rotating the charge of material and simultaneously feeding the same downward in an inclined direction, introducing fuel for combustion and sufficient air to maintain an oxidizing flame at the lower end of the charge, introducing material for the production of an oxidizing slag at the upper end of the charge, removing the slag from the charge and electrically maintaining the charge molten.

3. The method in the melting of scrap and pig iron and the like which consists in substantially continuously rotating the charge of material and simultaneously feeding the same downward in an inclined direction, introducing fuel for combustion and sufficient air to maintain an oxidizing flame at the lower end of the charge, introducing material for the production of an oxidizing slag at the upper end of the charge, removing the slag from the charge and electrically maintaining the charge molten under a slag.

4. The method in the melting of scrap and pig iron and the like which consists in substantially continuously rotating the charge of material and simultaneously feeding the same downward in an inclined direction, introducing fuel for combustion and sufficient air to maintain an oxidizing flame at the lower end of the charge, introducing material for the production of an oxidizing slag at the upper end of the charge, removing the slag from the charge and electrically maintaining the charge molten under a reducing slag.

5. The method in the melting of scrap and pig iron and the like which consists in substantially continuously rotating the charge of material and simultaneously feeding the same downward in an inclined direction, introducing fuel for combustion and sufficient air to maintain an oxidizing flame at the lower end of the charge, introducing material for the production of an oxidizing slag at the upper end of the charge, removing the slag from the charge and maintaining the charge molten under a reducing slag.

In testimony that I claim the above, I have hereunto subscribed my name.

THADDEUS F. BAILY.